United States Patent
Maddocks et al.

(10) Patent No.: US 10,966,550 B2
(45) Date of Patent: Apr. 6, 2021

(54) SYSTEM AND METHOD FOR ANIMATING A PLANT

(71) Applicant: Hello Tomorrow Inc., Pawtucket, RI (US)

(72) Inventors: Richard J. Maddocks, Barrington, RI (US); Leif J. Askeland, Greenville, RI (US); Eduardo J. Rodriguez, Tiverton, RI (US); Shelley M. Smith, Plymouth, MA (US)

(73) Assignee: HELLO TOMORROW INC., Pawtucket, RI (US)

(*) Notice: Subject to any disclaimer, the term of this patent is extended or adjusted under 35 U.S.C. 154(b) by 129 days.

(21) Appl. No.: 16/240,061

(22) Filed: Jan. 4, 2019

(65) Prior Publication Data

US 2019/0208932 A1   Jul. 11, 2019

Related U.S. Application Data

(60) Provisional application No. 62/613,917, filed on Jan. 5, 2018.

(51) Int. Cl.
*A47G 7/04*  (2006.01)
*A01G 9/02*  (2018.01)

(52) U.S. Cl.
CPC ............ *A47G 7/041* (2013.01); *A01G 9/028* (2013.01); *A47G 2007/048* (2013.01)

(58) Field of Classification Search
CPC .... A47G 7/041; A47G 2007/048; A47G 7/04; A01G 9/028; A01G 9/0295
See application file for complete search history.

(56) References Cited

U.S. PATENT DOCUMENTS

| | | | | |
|---|---|---|---|---|
| 1,336,307 A | * | 4/1920 | Loudon | A47G 7/041 248/140 |
| 1,396,445 A | * | 11/1921 | Loudon | A47G 7/041 248/154 |
| 1,609,246 A | * | 11/1926 | Hamburger | A47G 7/041 47/39 |
| 4,001,959 A | * | 1/1977 | Grendahl | A47G 1/0616 40/720 |
| 4,227,343 A | * | 10/1980 | Espy | A01G 9/00 185/27 |
| 6,128,854 A | * | 10/2000 | Chaney | A47G 7/041 47/39 |

(Continued)

*Primary Examiner* — Trinh T Nguyen

(74) *Attorney, Agent, or Firm* — Perry Hoffman

(57) ABSTRACT

A device and method that support and animate a plant disposed in an inner plant pot having an inner plant pot interior volume in such a way that the inner plant pot moves relative to an outer plant pot having an outer plant pot interior volume, and a gimbal mechanism disposed within the outer plant pot interior volume, controlling and instantiating, vertical longitudinal movement and rotational movement of the inner plant pot relative to the outer plant pot, programmable to provide physical response in the form of animation of the gimbal mechanism and the inner plant pot in response to receipt of predetermined data by the electronic processor control module from a plurality of sensors in communication with the electronic processor control module providing data collected by the plurality of sensors.

26 Claims, 6 Drawing Sheets

(56) References Cited

U.S. PATENT DOCUMENTS

| | | | | |
|---|---|---|---|---|
| 8,132,359 B1* | 3/2012 | Hudak | ................... | A47G 7/041 47/39 |
| 8,166,701 B1* | 5/2012 | Duff, Sr. | ................ | A47G 7/041 47/39 |
| 2005/0081439 A1* | 4/2005 | Lehman | ................ | A47G 7/041 47/39 |

* cited by examiner

SYSTEM AND METHOD FOR ANIMATING A PLANT

CROSS-REFERENCE TO RELATED APPLICATION(S)

This application claims priority to, and the benefit of, U.S. Provisional Application No. 62/613,917, filed Jan. 5, 2018, for all subject matter common to both applications. The disclosure of said provisional application is hereby incorporated by reference in its entirety.

FIELD OF THE INVENTION

The present invention relates to a method and system to facilitate the human interaction with live or artificial plants. Particularly, this invention relates to detecting a human interaction with live or artificial plants and triggering simulated responses from the live or artificial plants in response to human interaction. More particularly, the present invention relates to a method and system for the human interaction with live or artificial plants, the deciphering of these inputs and for the live or artificial plant to simulate the appropriate simulated plant response.

Specifically, the present invention relates to a novel system that enables live or artificial plants to simulate the sensing of human inputs and responding with movement, sound effects or scents, as appropriate. The present invention is also applicable to cut flowers, trees and shrubs as well as artificial plants, flowers, trees and shrubs.

BACKGROUND

Human interest in plant care dates back to the earliest recorded times. The rationale for human interest in plants varies from the need to grow own food and herbs to the urge to create beauty and to satisfy an artistic interest. In recent times there has been a growing interest in tending to plants to satisfy a need to nurture and to take care of a living thing. Lately the increased focus on health and wellness is fueling an interest in indoor plant arraignments as they contribute towards cleaning the air and is widely believed to reduce stress and anxiety, boost mood and provide a sense of wellbeing.

Because plants, whether live or artificial, do not speak, at least not in a language perceptible by humans, it is easy for humans to forget to feed and water or otherwise nurture live plants in a way one would with a dog or cat. Growing strong healthy plants takes a certain amount of commitment.

It is apparent that a need exists for a mechanism and technique whereby plants are able to express their needs in ways that can be interpreted and perceived by humans as tangible feedback, similar to household pets. The present invention is directed toward providing such a mechanism and technique.

SUMMARY OF THE INVENTION

The method and the system of the present invention provides one plant pot placed in a special relationship with a second outer pot. The inner pot is supported through a gimbal mechanism which enables the plant and pot assembly to move longitude as well as rotating side to side.

The inner pot assembly also contains a power supply, at least one electric motor or actuator, and a motor driver. Furthermore, the system includes electronic circuitry enabling the touch activation of plant leaves and stem. The interface between the circuitry and the plant is facilitated through the means of a soil probe which may be inserted from the top or from the bottom of the pot.

Furthermore, the inner or outer pot assemble may include a microphone, a light sensor, as well as means to communicate with adjacent plants through IR emitter and receiver or sound waves (audio watermarking).

In addition, the system of the present invention may include means to communicate with smart devices using electromagnetic waves (Blue Tooth, WIFI, IR, Audio watermarking).

The present invention advances the art of plant nurturing by enabling plants to communicate in ways that can be deciphered and understood by humans. This functionality will help accelerate and enhance the benefits of plant parenting and nurturing by humans. Furthermore, the plant will benefit from the ability to express its physiological needs communicating the physiological needs to humans to provide enhanced care.

The present invention can provide a method and a system for the human interaction with plants. The present invention can also provide a method and a mechanism to animate by physically moving the plant in response to human voice or touch input. Additionally, the present invention can provide a commercially practicable method for humans or machines to assign personalities that will govern the plant's behavior.

The invention can provide an opportunity for retailers, distributors or gift givers to customize the behavior and content of the plant's behavior.

The present invention can provide a technique for the plant through its behavior to communicate its physiological needs for irrigation, light, fertilizer etc.

The present invention can provide a system for plants to communicate with other plants in order to synchronize movements, sound effects and behavior.

In accordance with example embodiments of the present invention, a plant supporting and animating device comprises an outer plant pot having an outer plant pot interior volume, an inner plant pot having an inner plant pot interior volume, the inner plant pot mounted within the outer plant pot interior volume and sized, dimensioned, and configured to house a plant therein, and a gimbal mechanism disposed within the outer plant pot interior volume and supporting the inner plant pot in such a way that the inner plant pot moves relative to the outer plant pot.

In accordance with aspects of the present invention, the plant supporting and animating device can comprise a motor actuator mechanically coupled with the gimbal mechanism, wherein the motor actuator can control and instantiate vertical longitudinal movement of the inner plant pot relative to the outer plant pot. The motor actuator can control and instantiate rotational movement of the inner plant pot relative to the outer plant pot.

In accordance with aspects of the present invention, the plant supporting and animating device can comprise an electronic processor control module and a plurality of sensors in communication with the electronic processor control module providing data collected by the plurality of sensors. The plurality of sensors comprise one or more of a capacitance sensor, an audio sensor, an optical sensor, a vibrational sensor, a moisture sensor, a temperature sensor, a magnetic sensor, a chemical sensor, a motion sensor, an infrared sensor, and a wireless electromagnetic signal sensor. At least one of the plurality of sensors can comprise a capacitance sensor mounted to the plant that is housed within the inner plant pot interior volume in such a way that provides capacitance data that changes upon a user touching the plant.

The device can further comprise a soil probe disposed within the inner pot interior volume, enabling electronic communication between the electronic processor control module and a plurality of sensors. In accordance with aspects of the invention, the plant leaf can serve as the capacitance sensor, such that when a person touches a leaf a circuit is completed with conductivity via the soil probe. The device and in accordance with aspects of the present invention, the plant supporting and animating device can be programmable to provide physical response in the form of animation of the gimbal mechanism in response to receipt of predetermined data by an electronic processor controller from at least one sensor, which causes a resulting animation of the inner plant pot. Upon a user touching the plant, the gimbal mechanism can instantiate movement of the inner plant pot relative to the outer plant pot.

In accordance with aspects of the present invention, the plant supporting and animating device and electronic processor controller can comprise a means to communicate with smart devices using electromagnetic waves.

In accordance with example embodiments of the present invention, a plant supporting and animating method comprises supporting an inner plant pot having an inner plant pot interior volume in such a way that the inner plant pot moves relative to an outer plant pot having an outer plant pot interior volume, and a gimbal mechanism disposed within the outer plant pot interior volume, wherein the inner plant pot mounted within the outer plant pot interior volume and sized, dimensioned, and configured to house a plant therein. An electronic processor control module in electronic communication with a motor actuator mechanically coupled with the gimbal mechanism controls and instantiates vertical longitudinal movement and rotational movement of the inner plant pot relative to the outer plant pot.

In accordance with aspects of the present invention, the plant supporting and animating method can comprise a plurality of sensors in communication with the electronic processor control module providing data collected by the plurality of sensors, wherein the plurality of sensors comprise one or more of a capacitance sensor, an audio sensor, an optical sensor, a vibrational sensor, a moisture sensor, a temperature sensor, a magnetic sensor, a chemical sensor, a motion sensor, an infrared sensor, and a wireless electromagnetic signal sensor. At least one of the plurality of sensors can comprise a capacitance sensor, wherein the capacitance sensor is mounted to the plant that is housed within the inner plant pot interior volume in such a way that provides capacitance data that changes upon a user touching the plant. A soil probe can be disposed within the inner pot interior volume, the soil probe enabling electronic communication between the electronic processor control module and a plurality of sensors. In accordance with aspects of the invention, the plant leaf can serve as the capacitance sensor, such that when a person touches a leaf a circuit is completed with conductivity via the soil probe The electronic processor control module can be programmable to provide physical response in the form of animation of the gimbal mechanism in response to receipt of predetermined data by the electronic processor control module from at least one sensor, which causes a resulting animation of the inner plant pot. Upon a user touching the plant, the gimbal mechanism can instantiate movement of the inner plant pot relative to the outer plant pot.

The functionality and benefits provided by the present invention will be apparent to those skilled in the art from the description that follows.

DETAILED DESCRIPTION

Figure 1:
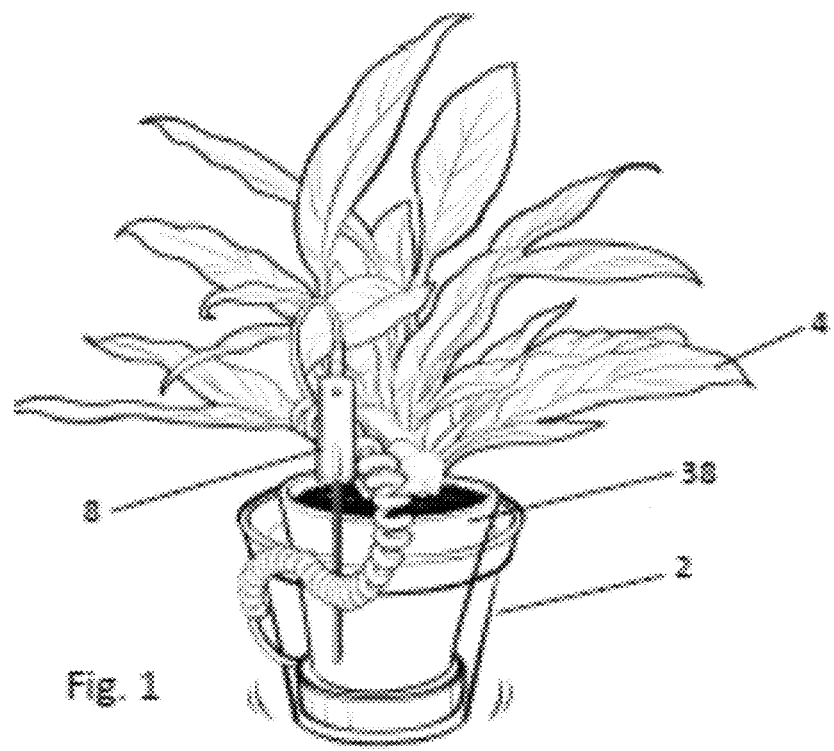
FIG. 1 is an illustrative perspective view showing the principal elements of the present invention.

The present invention is generally directed to a device and method that support and animate a plant disposed in an inner plant pot having an inner plant pot interior volume in such a way that the inner plant pot moves relative to an outer plant pot having an outer plant pot interior volume, and a gimbal mechanism disposed within the outer plant pot interior volume, controlling and instantiating, vertical longitudinal movement and rotational movement of the inner plant pot relative to the outer plant pot, programmable to provide physical response in the form of animation of the gimbal mechanism and the inner plant pot in response to receipt of predetermined data by the electronic processor control module from a plurality of sensors in communication with the electronic processor control module providing data collected by the plurality of sensors that capture plant behavior to communicate the physiological needs of that plant for irrigation, light, fertilizer etc.

FIGS. 1 through 11, wherein like parts are designated by like reference numerals throughout, illustrate an example embodiment or embodiments of improved operation for animating a plant, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Figure 2:
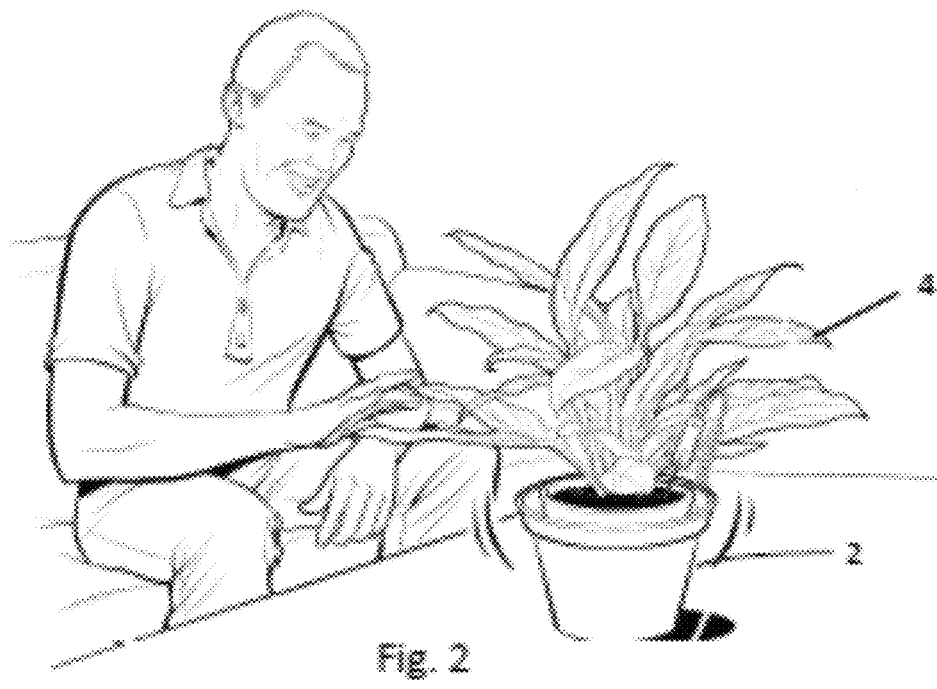
FIG. 2 is an illustrative perspective view showing a person interacting with the present invention.
Figure 4:
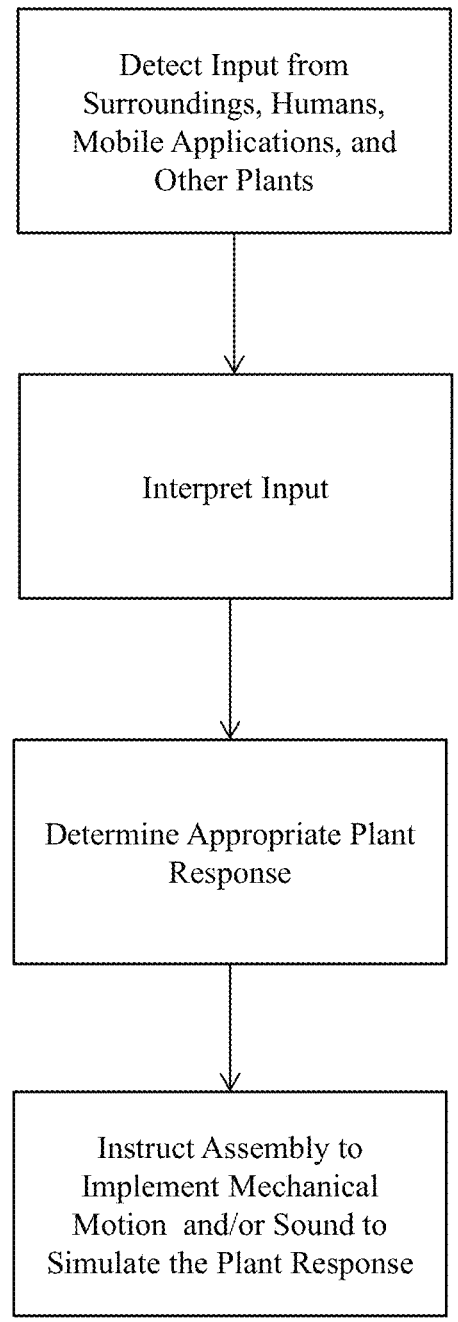
FIG. 4 is an illustrative flow chart for a simple operation in accordance with the present invention.

Referring to FIGS. 1 and 2, a person is illustrated seated in front of a flower pot containing a plant associated with the present invention. As would be appreciated by one skilled in the art, the plant can include any combination of living plant organism and/or artificial plant. The person is depicted touching and or stroking the leaves thereby initiating an interactive animated response from the plant. Referring to FIG. 4, a schematic block diagram/flow chart is provided depicting the capacitive sensing ability of the leaves wakes up the computer chip to unlock a preprogrammed sequence of animated routines including but not limited to the speed of stroking and touching, unlocking a musical sequence, initiating dance like movements, etc. In accordance with aspects of the invention, the plant leaf can serve as the capacitance sensor, such that when a person touches a leaf a circuit is completed with conductivity via a remote soil probe 8 that is placed in the soil, as would be understood by those of skill in the art.

Figure 3:
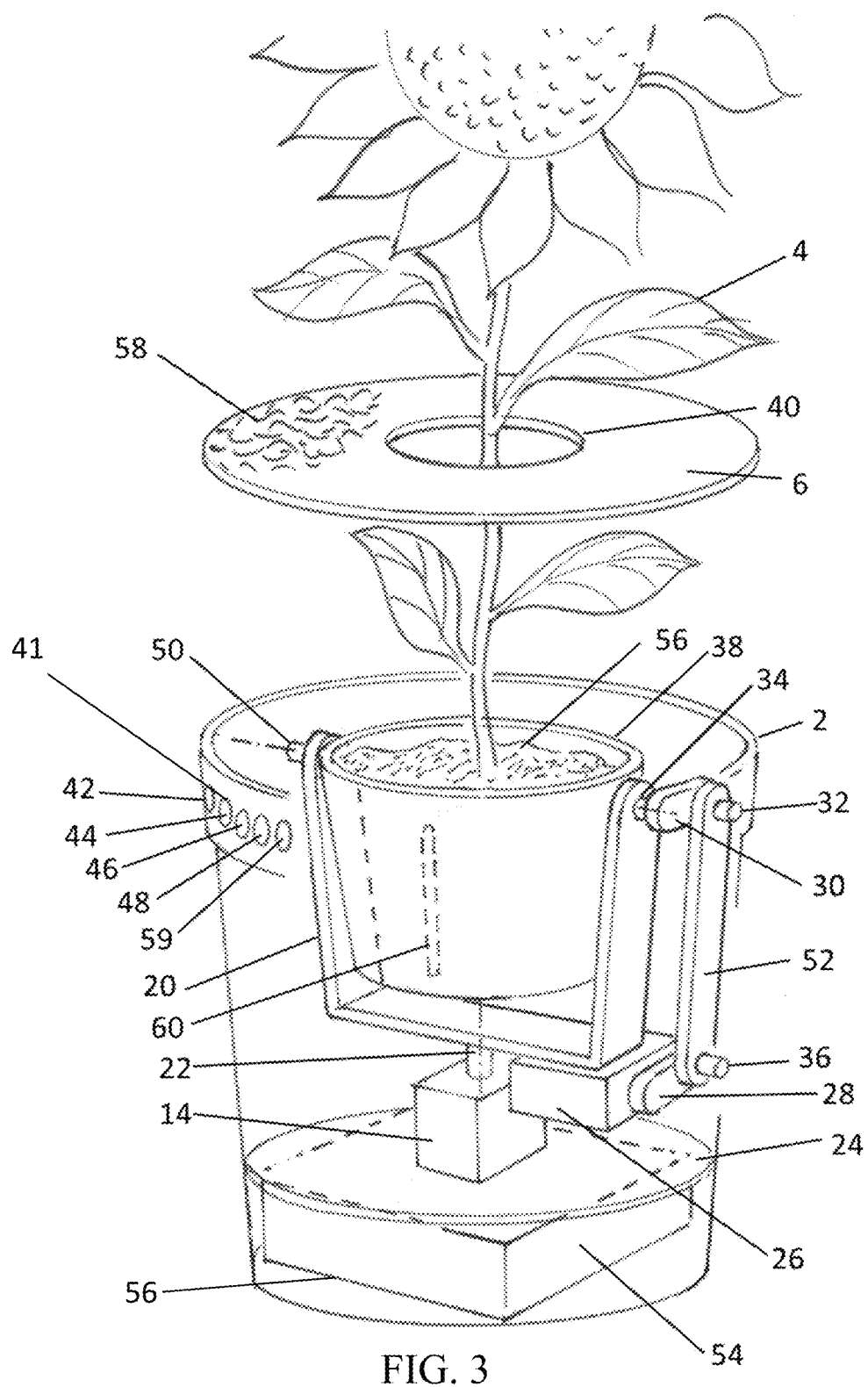
FIG. 3 is a schematic perspective view of internal pan (rotating left/right) and tilt (tilt forward back) mechanism, one embodiment of the present invention employing two motors.
Figure 5:
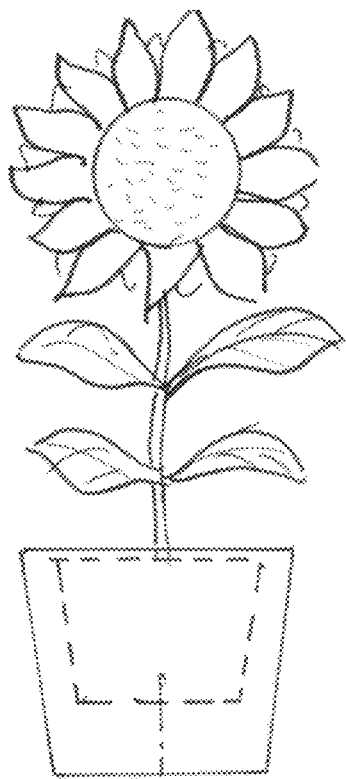
FIGS. 5, 6 and 7 are front views of the present invention illustrating the pan mechanism rotating left and right from the center or neutral position.
Figure 6:
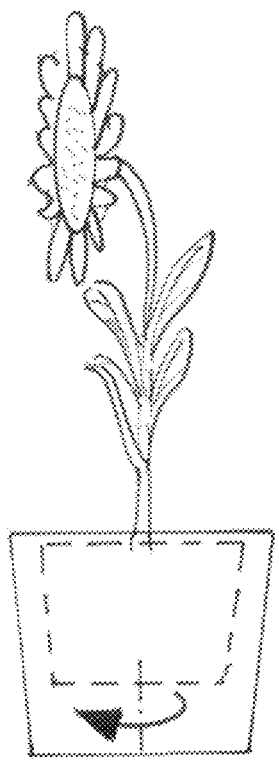
Figure 7:
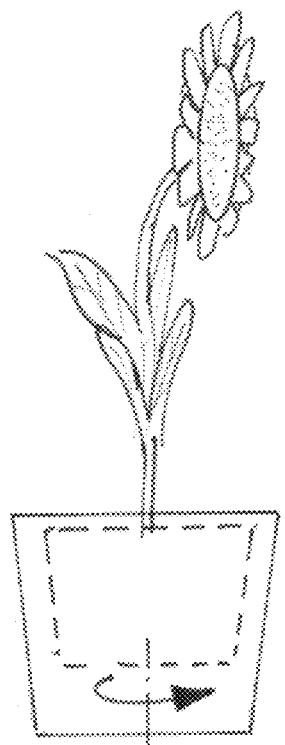

Referring to FIG. 3, a diagram of the system of the present invention is provided depicting how an illusion that the plant 4 is animated is achieved. In particular, FIG. 3 depicts the cover plate 6, with a top surface coated with simulated potting soil facilitating the emergence of the plant stem through the hole 40, thereby concealing the internal pan and tilt mechanism. Motor 14 is mounted on fixed base 24, an integral part of outer pot 2. The output shaft 22 is connected to the underside gimbal yoke 20, thereby rotating the gimbal yoke 20 about the axis of output shaft 22 when motor 14 is powered on. The resulting animated movement is illustrated in FIGS. 5, 6, and 7.

Figure 8:
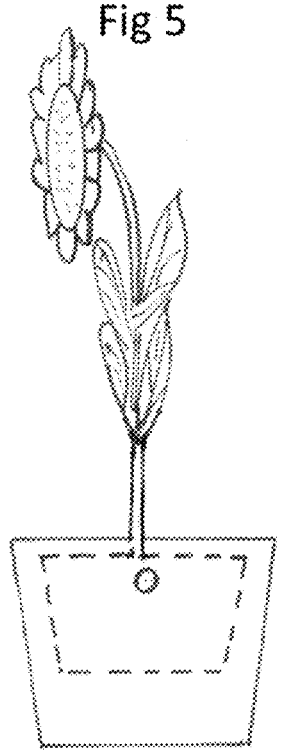
FIGS. 8, 9 and 10 are side views of the present invention illustrating the tilt mechanism tilting forward and back response appears.
Figure 9:
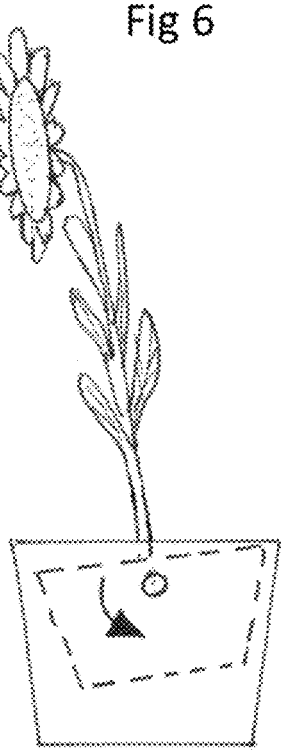
Figure 10:
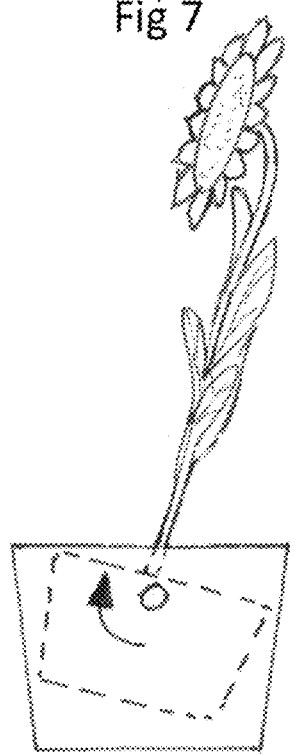

The inner pot 38, containing potting soil, is gimbal mounted on pivot pins 34 and 50 rotating within corresponding bearings in gimbal yoke 20. Crank arm 30 is rigidly attached to pivot pin 34, incorporating pin shaft 32. Tilt link 52 connects linkage pin 32 to linkage pin 36. Linkage pin 36 is rigidly attached to crank arm 28, mounted on output shaft of motor 26. Rotation of motor 26 clockwise or counterclockwise tilts the inner pot 38 forward or back form the neutral position, the movement transmitted by tilt link 52 and afore described linkages. The resulting animated movement is illustrated in FIGS. 8, 9, and 10.

As would be appreciated by one skilled in the art, pan and tilt animations may be activated individually or in combination utilizing motors 14 and 26 accordingly.

Module 54 located in base of pot incorporates a battery compartment providing the power source, and referring to FIG. 3, includes a printed circuit board (PCB) with central processing unit (CPU) and associated electronic components, which form an electronic processor control module 56 to which the motor 14 and if needed motor 26 are coupled.

Referring to FIGS. 1 and 3, two example embodiments of a plurality of sensors 41 are illustrated for use in accordance with the present invention. The sensors include but are not limited to a microphone to detect audio (e.g., voice, music, etc.), dual microphones for sound localization, a light sensor/s for detection of day or night, a proximity detector for proximity detection, and a camera for face recognition and proximity detection. In particular, FIG. 1 illustrates the remote soil probe 8 incorporating sensors inserted into the soil in the inner plant pot 38, such as a moisture sensor, or a soil chemical composition sensor. FIG. 3 illustrates an array of sensors incorporated in the surface of the outer pot 2. In an example embodiment, the sensors include an infra-red emitter/detector 42, a microphone 44, digital camera 46, a microphone 48, and a light sensor 59. A moisture sensor 60 is mounted inside the inner pot 38, and additionally serves as a soil probe (as such, can also be considered to be referred to as the remote soil probe 8). Those of skill in the art will appreciate that the remote soil probe 8 can incorporate any of the above-mentioned sensors (e.g, items 42, 44, 46, 48, 59) that would be operable for desired function in a soil probe environment. Those of skill in the art will appreciate that the data retrieved by the plurality of sensors 41 can be processed by the electronic processor control module 56, providing data and input to the electronic processor control module for processing and outputting signals to, e.g., the motors 14, 26, to instantiate movement or to other output devices in accordance with the operation of the present invention. In accordance with an example embodiment, the electronic processor control module 56 can retrieve data from the plurality of sensors 41 including the moisture sensor 60 and instantiate a communication via an audio speaker to output pre-programmed speech asking for water when the moisture is below a predetermined level, or indicating a sufficient level of water when the moisture is above a predetermined level. Those of skill in the art will appreciate that the specific moisture level would be dictated by the particular live plant 4 housed in the inner pot 38. In accordance with another example embodiment, the present invention interprets data retrieved from a moisture sensor 60 measuring moisture supplied to a plant that can describe its condition (e.g. over-hydrated, hydrated, under-hydrated, critically under-hydrated) and using preprogrammed speech ask for water, or announce that it has sufficient or excess water.

Referring to FIGS. 5, 6, and 7, depict animated responses simulated by the plant 4 can include, but are not limited to, welcoming gestures and other interactive gestures with a human. For example, the present invention can provide proximity detection that triggers the motor 14 to turn the inner pot 36 in a direction of the person as a welcoming gesture as a person approaches the system. If an approaching person speaks while approaching the system, utilizing sound localization sensors, the plant can turn in the direction of the approaching person utilizing motor 14 and track their movements.

Referring to FIGS. 8, 9, and 10, as the person moves in closer to the system, the present invention has the capability of detecting close proximity and, utilizing motor 26 and associated gearing and linkages, the inner pot 38 is enabled to tilt forward, in a welcoming gesture or recognition of presence (e.g., as illustrated in FIG. 9). Similarly, if a loud sound is created, such as clapping or shouting, the sensors detect increased sound level and mechanism tilts inner pot away from the front towards the rear (e.g., as shown in FIG. 10). Similarly, the system can interpret human gestures or actions as negative toward the plant 4 and respond appropriately. For example, rapid tapping or squeezing leaves can be used as input and will be interpreted by the system to be an aggressive action with appropriate aggressive plant reaction (e.g., backing away, shaking, etc.).

Although two-motor embodiment is illustrated in FIG. 3, as would be appreciated by one skilled in the art, a single-motor embodiment can be utilized as a cost saving measure for mass production. For example, the single motor can utilize cams, a Geneva mechanism or the like to pan and tilt the inner pot 38 using similar control input as detailed for the two-motor system.

The present invention can be configured with the additional capability of utilizing pan and tilt mechanism movements in conjunction with light sensors (and associated electronics and programming) for light tracking to follow the sunlight during course of a day for optimal plant health.

Figure 11:
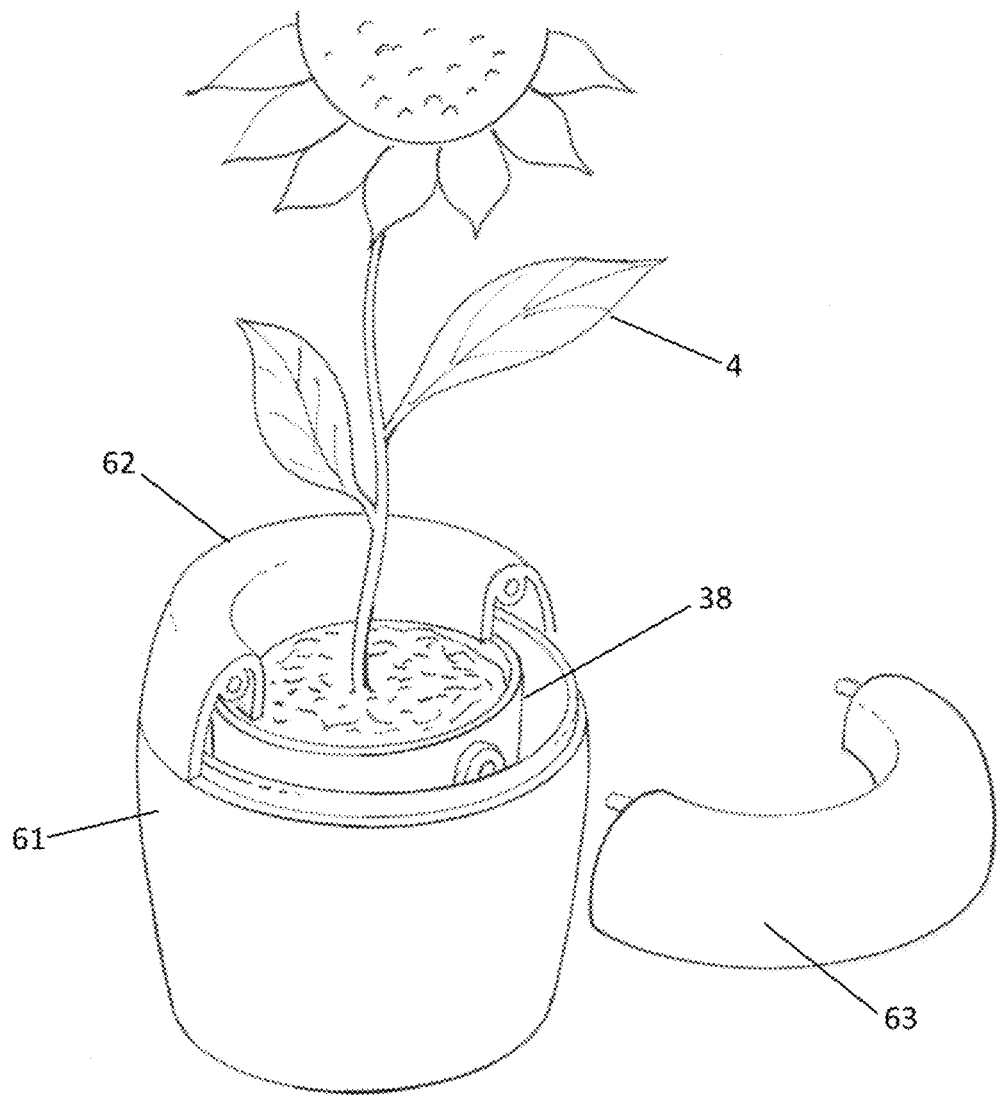
FIG. 11 is an illustrative perspective view showing the principal elements of an alternative cover embodiment with a top cover incorporated into the shape of a pot with a smaller diameter open top.

Referring to FIG. 11, an alternative embodiment is depicted with a top cover 62, 63 is incorporated into the shape of the pot with a smaller diameter open top 64 concealing the inner gimbaled mechanized pot 38 while allowing the plant to move as described. As an alternative embodiment, a top cover is incorporated into the shape of the pot with a smaller diameter open top concealing the inner gimbaled mechanized pot while allowing the plant to move as described. The shape of the outer pot may serve as an alternative to a cover, housing the motors 14, 26, inner gimbaled mechanized pot 38 and other components, while concealing those components from view.

Figure 12:
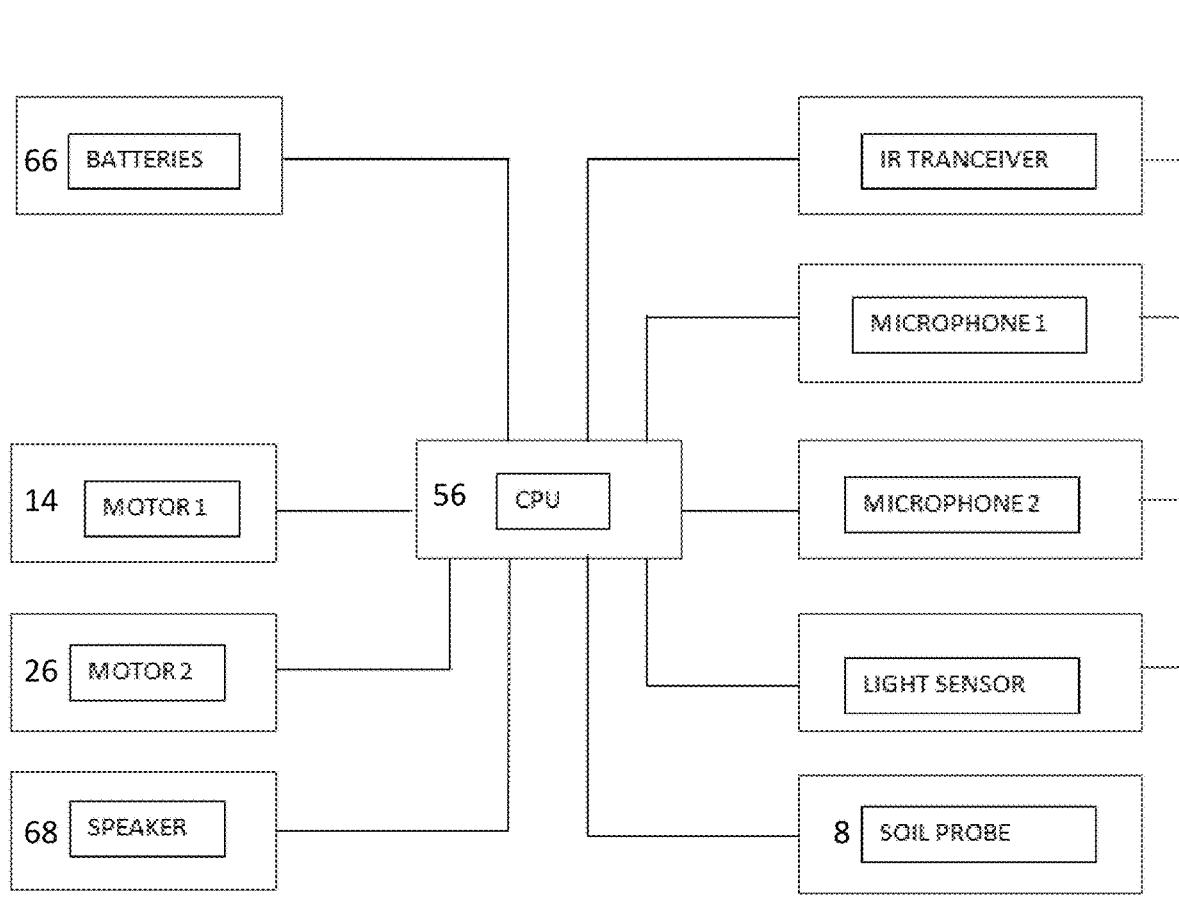
FIG. 12 depicts an illustrative example of the hardware architecture utilized in accordance with the present invention.

FIG. 12 illustrates an example of a electronic processor control module 56 for implementing aspects of the illustrative methods and systems of the present invention. The electronic processor control module 56 is merely an illustrative example of a suitable computing environment and in no way limits the scope of the present invention. A "electronic processor control module," 56 as represented by FIG. 12, can include a purpose built computing module, a "handheld device," a "mobile device," a "tablet computer," or other computing devices, as would be understood by those of skill in the art. Given that the electronic processor control module 56 is depicted for illustrative purposes, embodiments of the present invention may utilize any number of computing devices in any number of different ways to implement a single embodiment of the present invention. Accordingly, embodiments of the present invention are not limited to a single computing device, as would be appreciated by one with skill in the art, nor are they limited to a single type of implementation or configuration of the example computing device.

The electronic processor control module 56 can include a bus that can be coupled to one or more of the following illustrative components, directly or indirectly: a memory, one or more processors, one or more presentation components 68, input/output ports, input/output components 8, 41, and a power supply 66. One of skill in the art will appreciate that the bus can include one or more busses, such as an address bus, a data bus, or any combination thereof. One of skill in the art additionally will appreciate that, depending on the intended applications and uses of a particular embodiment, multiple components can be implemented by a single device. Similarly, in some instances, a single component can be implemented by multiple devices. As such, FIG. 12 is merely illustrative of an exemplary computing device that can be used to implement one or more embodiments of the present invention, and in no way limits the invention.

The electronic processor control module 56 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the electronic processor control module 56.

The memory can include computer-storage media in the form of volatile and/or nonvolatile memory. The memory can be removable, non-removable, or any combination thereof. Exemplary hardware devices are devices such as hard drives, solid-state memory, optical-disc drives, and the like. The electronic processor control module 56 can include one or more processors that read data from components such as the memory, the various I/O components 8, 41, etc. Presentation component(s) 68 present data indications to a user or other device. Exemplary presentation components 68 include a display device, speaker 68, vibrating component, etc. The I/O ports can allow the electronic processor control module 56 to be logically coupled to other devices, such as I/O components 8, 41. Some of the I/O components 8, 41 can be built into the electronic processor control module 56. Examples of such I/O components 8, 41 include a microphone, recording device, wireless device, Bluetooth® device, networking device, and the like.

One of skill in the art will appreciate a wide variety of ways to modify and alter the system and method of FIGS. 1-12, as well as the various components with which it interacts. For example, the one or more computing systems can be implemented according to any number of suitable computing system structures. Furthermore, some or all of the information contained in the one or more data sources alternatively can be stored in one or more remote databases (e.g., cloud databases, virtual databases, and any other remote database).

In some embodiments, it may be desirable to implement the method and system using multiple iterations of the depicted modules, controllers, and/or other components, as would be appreciated by one of skill in the art. Furthermore, while some modules and components are depicted as included within the system, it should be understood that, in fact, any of the depicted modules alternatively can be excluded from the system and included in a different system. One of skill in the art will appreciate a variety of other ways to expand, reduce, or otherwise modify the system upon reading the present specification.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A plant supporting and animating device, comprising:
an outer plant pot having an outer plant pot interior volume;
an inner plant pot having an inner plant pot interior volume, the inner plant pot mounted within the outer plant pot interior volume and sized, dimensioned, and configured to house a plant therein;
a gimbal mechanism disposed within the outer plant pot interior volume and supporting the inner plant pot in such a way that the inner plant pot moves relative to the outer plant pot, wherein the gimbal mechanism having a yoke mounted within the outer plant pot interior volume, a pivoted support mechanism at the yoke for supporting the inner plant pot within the outer plant pot interior volume, a tilt link at the pivoted support mechanism to facilitate vertical longitudinal inner plant pot movements at the pivoted support mechanism;
a motor actuator mechanically coupled with the tilt link for movement of the inner plant pot relative to the outer plant pot; and
an electronic processor control module in electronic communication with the motor actuator for controlling inner plant pot movements.

2. The plant supporting and animating device of claim 1, wherein the motor actuator controls and instantiates vertical longitudinal movement of the inner plant pot relative to the outer plant pot.

3. The plant supporting and animating device of claim 1, wherein the motor actuator controls and instantiates rotational movement of the inner plant pot relative to the outer plant pot.

4. The plant supporting and animating device of claim 1, further comprising an electronic processor control module.

5. The plant supporting and animating device of claim 1, further comprising a plurality of sensors in communication with the electronic processor control module providing data collected by the plurality of sensors.

6. The plant supporting and animating device of claim 5, wherein the plurality of sensors comprise one or more of a capacitance sensor, an audio sensor, an optical sensor, a vibrational sensor, a moisture sensor, a temperature sensor, a magnetic sensor, a chemical sensor, a motion sensor, an infrared sensor, and a wireless electromagnetic signal sensor.

7. The plant supporting and animating device of claim 5, wherein at least one of the plurality of sensors comprises a capacitance sensor.

8. The plant supporting and animating device of claim 7, wherein the plurality of sensors comprise a soil probe, the capacitance sensor comprises a leaf of a plant, and a conductive circuit is completed when a user touches the leaf and the conductivity circuit is completed via the soil probe, which provides capacitance data that changes upon the user touching the plant.

9. The plant supporting and animating device of claim 1, further comprising a soil probe disposed within the inner pot interior volume, the soil probe enabling electronic communication between the electronic processor control module and a plurality of sensors.

10. The plant supporting and animating device of claim 1, wherein the device is programmable to provide physical response in the form of animation of the gimbal mechanism in response to receipt of predetermined data by an electronic processor controller from at least one sensor, which causes a resulting animation of the inner plant pot.

11. The plant supporting and animating device of claim 1, wherein upon a user touching the plant, the gimbal mechanism instantiates movement of the inner plant pot relative to the outer plant pot.

12. The plant supporting and animating device of claim 1, wherein an electronic processor controller comprises a means to communicate with smart devices using electromagnetic waves.

13. A plant supporting and animating method, comprising:
supporting an inner plant pot having an inner plant pot interior volume in such a way that the inner plant pot moves relative to an outer plant pot having an outer plant pot interior volume, and a gimbal mechanism disposed within the outer plant pot interior volume, wherein the gimbal mechanism having a yoke mounted within the outer plant pot interior volume, a pivoted support mechanism at the yoke for supporting the inner plant pot within the outer plant pot interior volume, a tilt link at the pivoted support mechanism to facilitate vertical longitudinal inner plant pot movements at the pivoted support mechanism;
wherein the inner plant pot mounted within the outer plant pot interior volume and sized, dimensioned, and configured to house a plant therein; and
controlling and instantiating, using an electronic processor control module in electronic communication with a motor actuator mechanically coupled with the tilt link for movement of the inner plant pot relative to the outer plant pot, vertical longitudinal movement and rotational movement of the inner plant pot relative to the outer plant pot.

14. The plant supporting and animating method of claim 4, further comprising a plurality of sensors in communication with the electronic processor control module providing data collected by the plurality of sensors.

15. The plant supporting and animating method of claim 5, wherein the plurality of sensors comprise one or more of a capacitance sensor, an audio sensor, an optical sensor, a vibrational sensor, a moisture sensor, a temperature sensor, a magnetic sensor, a chemical sensor, a motion sensor, an infrared sensor, and a wireless electromagnetic signal sensor.

16. The plant supporting and animating method of claim 5, wherein at least one of the plurality of sensors comprises a soil probe, the capacitance sensor comprises a leaf of a plant, and a conductive circuit is completed when a user touches the leaf and the conductivity circuit is completed via the soil probe, which provides capacitance data that changes upon the user touching the plant.

17. The plant supporting and animating method of claim 4, further comprising a soil probe disposed within the inner pot interior volume, the soil probe enabling electronic communication between the electronic processor control module and a plurality of sensors.

18. The plant supporting and animating method of claim 4, wherein the electronic processor control module is programmable to provide physical response in the form of animation of the gimbal mechanism in response to receipt of predetermined data by the electronic processor control module from at least one sensor, which causes a resulting animation of the inner plant pot.

19. The plant supporting and animating method of claim 1, wherein upon a user touching the plant, the gimbal mechanism instantiates movement of the inner plant pot relative to the outer plant pot.

20. A plant supporting and animating device, comprising:
- an outer plant pot having an outer plant pot interior volume;
- an inner plant pot having an inner plant pot interior volume;
- a yoke mounted within the outer plant pot interior volume;
- a pivoted support mechanism at the yoke for supporting the inner plant pot within the outer plant pot interior volume;
- a tilt link at the pivoted support mechanism to facilitate vertical longitudinal inner plant pot movements at the pivoted support mechanism;
- a motor actuator mechanically coupled with the tilt link for movement of the inner plant pot relative to the outer plant pot; and
- an electronic processor control module in electronic communication with the motor actuator for controlling inner plant pot movements.

21. The plant supporting and animating device of claim 20, further comprising one or more sensors in communication with the electronic processor control module providing data collected by the one or more sensors.

22. The plant supporting and animating device of claim 20, further comprising one or more sensors in communication with the electronic processor control module providing data collected by the one or more sensors wherein the motor actuator controls and instantiates movement of the inner plant pot relative to the outer plant pot including upon a user touching the plant.

23. The plant supporting and animating device of claim 20, further comprising a plurality of sensors in communication with the electronic processor control module providing data collected by the plurality of sensors wherein the plurality of sensors comprise one or more of a capacitance sensor, an audio sensor, an optical sensor, a vibrational sensor, a moisture sensor, a temperature sensor, a magnetic sensor, a chemical sensor, a motion sensor, an infrared sensor, and a wireless electromagnetic signal sensor wherein the motor actuator controls and instantiates movement of the inner plant pot relative to the outer plant pot\ responsive to one or more of the plurality of sensors.

24. The plant supporting and animating device of claim 20, further comprising a soil probe disposed within the inner pot interior volume, the soil probe enabling electronic communication with the electronic processor control module.

25. The plant supporting and animating device of claim 20, comprising a gimbal mechanism wherein the yoke mounted within the outer plant pot interior volume comprises a gimbal yoke.

26. The plant supporting and animating device of claim 20, wherein the electronic processor controller comprises a means to communicate with smart devices using electromagnetic waves.

* * * * *